(12) United States Patent
Reiner et al.

(10) Patent No.: US 10,990,689 B1
(45) Date of Patent: Apr. 27, 2021

(54) DATA GOVERNANCE THROUGH POLICIES AND ATTRIBUTES

(71) Applicant: EMC Corporation, Hopkinton, MA (US)

(72) Inventors: David Reiner, Lexington, MA (US); Nihar Nanda, Acton, MA (US); Philip Edwards, Liverpool (GB)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 584 days.

(21) Appl. No.: 15/088,085

(22) Filed: Mar. 31, 2016

(51) Int. Cl.
| | | |
|---|---|---|
| *G06F 21/62* | (2013.01) | |
| *G06F 21/60* | (2013.01) | |
| *H04L 29/06* | (2006.01) | |
| *H04L 9/32* | (2006.01) | |
| *G06Q 10/06* | (2012.01) | |
| *G06Q 30/02* | (2012.01) | |
| *G06F 21/57* | (2013.01) | |
| *G06Q 10/00* | (2012.01) | |

(52) U.S. Cl.
CPC ........ *G06F 21/6218* (2013.01); *G06F 21/604* (2013.01); *H04L 63/10* (2013.01); *H04L 63/20* (2013.01); *G06F 21/577* (2013.01); *G06Q 10/00* (2013.01); *G06Q 10/063* (2013.01); *G06Q 30/0277* (2013.01); *H04L 9/3271* (2013.01)

(58) Field of Classification Search
CPC ...... G06F 21/62; G06F 21/6218; G06F 21/60; G06F 21/604; G06F 21/577; G06F 17/30; G06F 17/30082; G06F 17/30085; G06F 16/122; H04L 63/10; H04L 63/20; H04L 63/1433; H04L 63/0815; H04L 9/3271; H04L 29/06; G06Q 10/063; G06Q 10/00; G06Q 30/0277; H04N 21/4331; H04N 7/17318; H04N 21/84; H04N 21/25883
USPC ....... 726/1, 4, 26, 2, 3, 30; 725/139, 28, 44; 707/694
See application file for complete search history.

(56) References Cited

U.S. PATENT DOCUMENTS

| | | | | |
|---|---|---|---|---|
| 8,474,018 | B2 * | 6/2013 | Mardikar | H04L 63/1433 726/4 |
| 8,566,906 | B2 * | 10/2013 | Gross | G06F 21/6218 726/2 |
| 8,843,997 | B1 * | 9/2014 | Hare | H04L 63/0815 726/3 |

(Continued)

FOREIGN PATENT DOCUMENTS

WO    WO-2003/044718 A2 *   5/2003   ............. G06Q 10/00

OTHER PUBLICATIONS

How to Manage Assets Using Footprints CMDB Listed by: https://its.sfsu.edu/sites/default/files/How_To_Manage_Assets_CMDB.pdf pp. 14; Last Updated: Aug. 23, 2013.*

*Primary Examiner* — Samson B Lemma
*Assistant Examiner* — Ali H. Cheema
(74) *Attorney, Agent, or Firm* — Workman Nydegger

(57) ABSTRACT

Systems and methods for governing access to or use of assets in an analytics platform. Access to assets is controlled with policies that reference attributes. A context of an access request is defined by collecting attributes associated with an access request. The context is then evaluated in light of attributes referenced by the policy applicable to the asset or with a class of the asset. The access request is granted, denied, or partially granted based on whether the attributes defined by the context of the access request comport with the policy.

24 Claims, 5 Drawing Sheets

(56) References Cited

U.S. PATENT DOCUMENTS

| | | | | |
|---|---|---|---|---|
| 8,898,701 | B2* | 11/2014 | Philbin | H04N 21/84 |
| | | | | 725/44 |
| 10,140,083 | B1* | 11/2018 | Nguyen | G06F 3/165 |
| 2002/0095459 | A1* | 7/2002 | Laux | H04L 29/06 |
| | | | | 709/203 |
| 2006/0236369 | A1* | 10/2006 | Covington | H04L 9/3271 |
| | | | | 726/1 |
| 2007/0282899 | A1* | 12/2007 | Goodman | H04L 67/28 |
| 2008/0060080 | A1* | 3/2008 | Lim | H04L 63/107 |
| | | | | 726/26 |
| 2008/0091637 | A1* | 4/2008 | Escamilla | G06F 16/951 |
| 2008/0163328 | A1* | 7/2008 | Philbin | H04N 7/17318 |
| | | | | 725/139 |
| 2009/0288135 | A1* | 11/2009 | Chang | H04L 63/20 |
| | | | | 726/1 |
| 2011/0162089 | A1* | 6/2011 | Hinton | G06F 21/6218 |
| | | | | 726/30 |
| 2012/0046978 | A1* | 2/2012 | Cartwright | G06Q 10/063 |
| | | | | 705/7.11 |
| 2015/0106873 | A1* | 4/2015 | Marsh | G06F 21/577 |
| | | | | 726/1 |
| 2015/0249852 | A1* | 9/2015 | Tang | H04N 21/25883 |
| | | | | 725/28 |
| 2015/0356095 | A1* | 12/2015 | Davis Jones | G06F 16/122 |
| | | | | 707/694 |
| 2016/0379276 | A1* | 12/2016 | Ruggiero | G06Q 30/0277 |
| | | | | 705/14.71 |
| 2017/0064410 | A1* | 3/2017 | Grant | H04N 21/4331 |

\* cited by examiner

DATA GOVERNANCE THROUGH POLICIES AND ATTRIBUTES

RELATED APPLICATIONS

This application is related to U.S. application Ser. No. 15/083,029, now U.S. Pat. No. 10,754,838 filed on Mar. 31, 2016 and entitled A REGISTRATION FRAMEWORK FOR AN ANALYTICS PLATFORM. The foregoing application is incorporated by reference in its entirety.

FIELD OF THE INVENTION

Embodiments of the invention relate to data analytics in an analytics platform. More specifically, embodiments of the invention relate to systems and methods for controlling access to and use of assets of an analytics platform.

BACKGROUND

Generally, data analytics relates to the process of drawing information or conclusions from data. Data analytics relates, for example, to data mining, model development, predictive data modeling, and the like. An analytics platform provides tools so that users of the platform can analyze the data. Users of an analytics platform can use the tools and the data to perform investigations, develop models, make predictions, support policies, and the like.

There are many uses for data analytics. An entity or user, for example, may use an analytics platform to evaluate business data in order to help the business make better decisions or to model their customers or to predict sales. The analytics platform may be used to assess the likelihood of theories (e.g., what offers customers are likely to respond to).

An analytics platform includes assets that allow users to perform various types of operations. The assets used in the analytics platform may include data sets, data sources, searches, tools, applications, services, programs, and other resources. Because users perform analytics using multiple types of assets, there is a need to govern how the assets are accessed and used. Systems and methods are needed to govern access to and use of the assets of an analytics platform.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
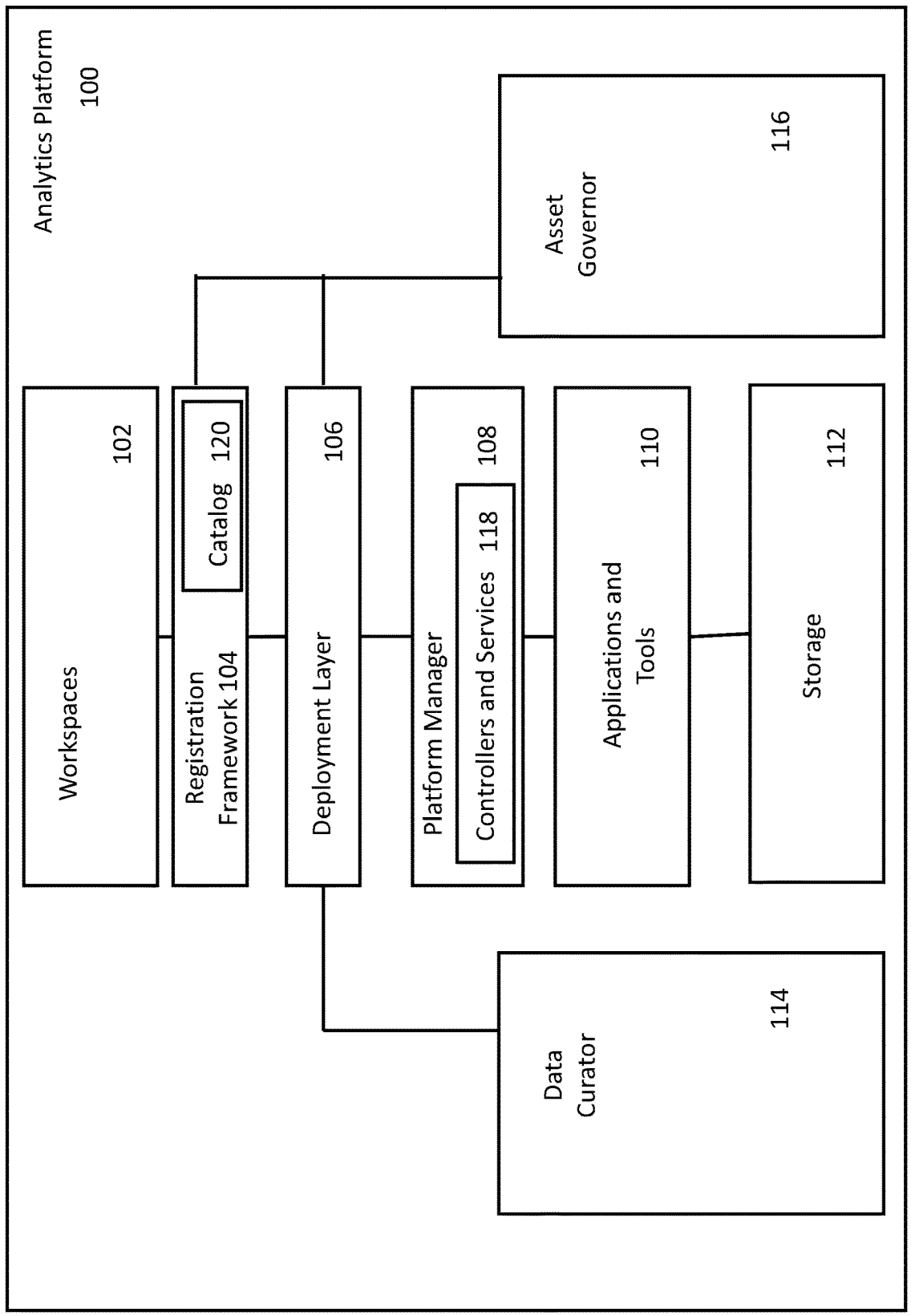
FIG. 1 illustrates an example of an analytics platform that includes an asset governor configured to control access to and use of assets in the analytics platform.

Embodiments of the invention relate to systems and methods for controlling access to and use of assets of an analytics system. An analytics platform is configured to store assets such as data sets and enables users to perform operations or analytics on the data sets. Other assets such as tools and applications that are available in an analytics platform can be used to perform operations to conduct investigations, develop models, make predictions, improve business operations and outcomes and develop and analyze business rules.

The assets of an analytics platform include, but are not limited to, data sources, data source connectors, data services, tools, applications, queries, searches, data sets, commercial tools, templates, services, scripts, analytic models, programs, visualizations, virtual machines, and the like and combinations thereof. Embodiments of the invention control or govern access to and usage of these assets. In addition, attributes of the users (e.g., seniority, security clearance, title, location) may be used by the asset governor to control access to or use of an asset in the analytics platform.

Embodiments of the invention associate metadata with these assets. Attributes associated with an asset class or with a particular asset may be referred to as metadata. The assets of an analytics platform are associated with first metadata that is often descriptive and technical in nature. In one example, the metadata may be intrinsic to the asset. Examples of the intrinsic metadata include, but are not limited to, creation date, file format, structure, size, access time or times, and the like. Metadata may also include metadata that is derived from the assets or specifically associated with the assets or associated with use of the assets. Examples include, but are not limited to, encodings, privacy indications, quality assessments, historical ratings, recommendations, and annotations, state, and the like. More generally, embodiments of the invention associate metadata with the assets. Examples of other metadata include, but are not limited to, attributes of the asset, attributes of the asset's environment (including a source and a destination of the asset), and attributes of the user. Other attributes include assets associated with the ingestion, history, lineage or the like or combination thereof.

Operations performed by users of an analytic platform include, but are not limited to, data set ingestion, copying, subsetting, filtering, tokenization, encryption, transformation, combination, indexing, querying, searching, scoring, tagging, modelling, predictive modelling and the like or combination thereof.

Access to an asset of the analytics platform is not limited to accessing the asset. Access, as used herein, may also refer to use of the asset or to performing one or more operations on the asset. When the asset is a data set, for example, access can include deploying the data set, reading the data set, writing to the data set, viewing a summary of the data set, navigating the data set, reading a redacted version of the data set, making a copy of the data set, performing analytics with or on the data set, ingesting the data set, or the like or combination thereof. Access can also include using tools and applications on the asset. When the asset is a tool or application, access may include provisioning the tool or application in a workspace, configuring the tool or application or its components or environment, invoking the tool, using functions of the tool, or the like or combination thereof.

Many assets in an analytics platform are related to data such as data sets, data sources, data source connectors, data services, queries, searches, and the like. A data set, in one example, may be a collection of similarly structured data. The following table illustrates examples of data set structures and provides non-limiting examples of the data set structures.

| Data Set Structure | Typical Examples |
| --- | --- |
| Relational table | Customers, Employees, Transactions, Resource access history, Time series summary |
| File | Flat file, Audio recording, Photo, Process output file, Log file, Hadoop file, BLOB (Binary Large Object) |
| Key-Value pairs | Twitter hash tag counts, Diagnosis codes, Sensor data, Index, Cache |
| Stream of elements | Market ticks, Surveillance video, Messages, RFIDs, Sensor data |
| Graph | Employee skills, Transit routing, Network assets, Access permissions, Web browsing behavior, Gene sequences, Social media influence, Recommendation engine internals |
| Query or search result | Emails from an archive, Medical test results, Current product suppliers, Product pricing at a given time |
| Document | MongoDB document, XML document, RSS feed, Financial results (XBRL), Website content |
| Report | Sales by region, Top blog topics in last 24 hours, A-B Marketing test results |
| Multi-dimensional cube | Sales by geography and by customer segment and by time period. |
| Web Service | Customer discount by volume, Shipment tracking |
| Index | Content index, Federated content index |

These are examples of data sets or assets that can be ingested into analytics platform and that can be accessed. Other assets include services, templates, scripts, 12-factor applications, commercial tools, analytic models, reports, visualizations, virtual machines, and the like. Tools, applications, or the like may be used to perform operations on these data sets.

In one example, embodiments of the invention control or govern access to the assets based on the attributes (or other metadata) of the assets or on attributes associated with a context of the access. Attributes that may be used to control or govern access to or use of an asset may be included in or referenced by a policy.

A policy typically applies to a class of assets. As a result, the policy used to control access to an asset is identified, in one example, according to the class of the asset. When the policy is enforced, the context in which access is requested is evaluated with the policy. For example, the context of the access request can be associated with attributes whose values can be compared to the values of the attributes referenced by the policy.

More specifically, when a policy is enforced, a policy information point in the analytics platform may collect or identify attributes associated with the context of the access request. Examples of the attributes associated with or that define the context of the request may include, but are not limited to, credentials of the user, time of access, machine used for the access request, or the like or combination thereof. More generally, the attributes collected by the policy information point may be associated with the user, the asset, the environment, the access request itself, or the like or combination thereof. A simple example of a policy and the attributes it references that are associated with a user is: "Data sets containing personally identifying information (PII) may only be read by employees who have been with the company for at least 5 years." The attributes collected or identified by the policy information point may be presented to a policy decision point. The policy decision point references attributes associated with the context of the access request (which were collected by the policy information point) and a decision is made regarding the access request. The access request is granted or denied for example by the policy decision point. Alternatively, the decision may be deferred according to the policy to a human decision maker. For example, when an access request is received from a requestor, the policy decision point may look at one or more of the requestor's role, the requested operation, the asset for which the operation is being requested, and the context of the access request. One or more of these attributes can be used to make a decision regarding the access request. The specific attributes reviewed by the policy decision point may depend on which policies apply to the requested asset.

Policy decisions can be achieved or made by applying rules. For example, the attributes associated with a policy may stipulate that access is granted only at certain times. When the access request is intercepted or received, attributes associated with the access request may be identified. One of the attributes included in the context of the access request may be a time attribute. Thus, the time is an example of an attribute of the context of the access request and can be compared with the attributes referenced by the policy. The rule would then state that access is granted if the time is in accordance with the policy. If the time of the access request is outside of the time referenced by the policy, the access request is denied. For example, access to an asset may only be permitted by the policy between the local hours of 8 AM and 5 PM. If the access request is outside of this time period, then the access request may be denied.

By associating multiple types of attributes with an asset (or with a class of assets), policies can be used to control or govern access to or use of the asset or to a class of assets. Embodiments of the invention collect a substantial amount of metadata and the ability to control or govern access is greatly enhanced. Policies can be defined that govern, by way of example and not limitation, the placement, visibility, security, access, searchability, navigability, and tracking of the asset. Policies can also be defined that control when and how an asset such as a data set or tool can be deployed to a workspace, whether and when a data set can be published, where results of an operation are available and how the results are available, or the like. Many aspects of data analytics or subsets thereof can be controlled or governed.

In addition, a policy may reference multiple types of attributes that can be used to control access. For example, access to a particular asset or class of assets may be controlled based on attributes associated with the requested asset as well as attributes associated with the user, the environment, or other context of the access request for which at attribute can be defined. This allows the attribute identified for the context of the access request to be compared with the same attribute type that is associated with the policy.

Access can be requested by different types of users. Software tools or applications may make access requests and users may also make access requests. Each asset is associated with attributes that can be used to evaluate the access requests. The policies that apply to the access request, however, may only reference a subset of all possible attributes. Other attributes associated with policies and associated with the context of the access request may be characteristics associated with the user, the asset, the computing environment, or the like and these attributes may also be used when evaluating the access requests. In one example, a value or range of values can be assigned to these attributes. This allows rules to be applied or comparisons to be made when evaluating an access request to determine whether access should be granted, denied, or restricted based on the asset requested and the associated policy. For example, a policy for a particular asset or for a certain asset class may be associated with an access time attribute, an encryption attribute and a rating attribute. When the access request is evaluated, the same attributes associated with the context of the access request are collected. The collected attributes can then be compared with the attributes associated with the policy to determine whether the access request is granted. The policy may state that encrypted assets that have been rated as high quality cannot be accessed after 5 PM. An access request for an encrypted asset of high quality at 4 PM is granted.

Embodiments of the invention further relate to controlling access to assets such as data sets based on metadata attached to the asset. The metadata may describe the state of the asset, what operations can be performed on the asset, how the asset can be customized, how the asset can be moved into workspaces or other areas or containers of the analytics platform. In effect, this type of metadata may include instructions that allows the asset to be manipulated, transformed, flattened, or the like.

In some examples, an asset governor may cooperate with a registration framework to govern access to or use of the assets. The registration framework allows new assets and existing assets to be registered, discovered, accessed, deployed, moved, copied, and used in isolation. Assets can be used in isolation from an asset security perspective as well as a data protection perspective. The registration framework allows new and/or existing assets to be used independently or combined and analyzed together. The registration framework allows asset histories (e.g., different versions of an asset, manner in which an asset has been used in the past, history of conclusions or results drawn from assets), asset lineage (e.g., how the asset has been transformed), asset state (e.g., location, container) and relationships between assets to be discovered and/or considered when performing analytics. Relevant data sets (or assets) for a given project can be discovered after the data sets (or assets) are registered by the registration framework. More generally, assets registered by the registration framework can be discovered, searched, annotated, tagged, used, revised, changed, transformed, or the like or combination thereof.

The registration framework allows assets to be treated in a uniform manner regardless of whether the asset is an existing asset in the analytics platform or a new asset being added to or ingested into the analytics platform. Embodiments of the registration framework can be used on assets that already exist within the analytics platform or on assets that are newly added to the analytics platform. The registration framework may associate metadata with the assets and the metadata can be organized in a uniform manner so that, when the registration framework is searched, assets corresponding to the search parameters can be identified.

The registration framework may be able to cope with multiple tool sets. Embodiments of the invention allow groupings of applications and tools to be known, observed and followed. Embodiments of the invention allow tools and applications to be meaningfully grouped and consistently manipulated.

The registration framework may be extensible and may allow new asset classes to be added to the platform. Assets or asset classes identified in the registration framework may also be associated with a manifest. A manifest, for example, may include metadata associated with the asset class or with specific assets, instructions for deploying the assets or asset instances, and other procedures for performing various operations on the asset.

The registration framework allows assets to be browsed or navigated in multiple dimensions. Further, the use of the asset can be controlled using some of the same information stored in the associated manifest. The manifests may store additional metadata related to users, assets being used in workspaces, deployment instructions, container types associated with asset classes, and relationships among these attributes. This allows a user, for example, to search for an asset based on which assets are deployed or based on how assets are deployed, based on which users are using assets in a particular class, or combination thereof. As a result, access to or use of the assets can also be controlled based on these relationships. The policies, for example, may control access to and use of an asset based on deployment information, types of containers into which an asset is deployed, controllers used to deploy the assets, transformations of the asset, asset histories, asset states, or the like or combination thereof. The asset governor can control access to and use of assets with respect to multiple dimensions.

An extensible registration framework may be used to describe and register assets of any type and form. The registration framework can support transformations and deployments of assets as needed into any container that would be suitable for a deployment of an asset of a type and form and state. The result of an analytics operation can be a transformed asset of a different type and form and state. The registration framework understands this transformation and the resulting state of the transformed asset. The registration framework is extensible in that a description language enables new classes of assets to be added to the registration framework and to the analytics platform. The registration framework may also specify the deployment and transformation steps for assets including new classes of assets.

FIG. 1 illustrates an example of an analytics platform 100. The analytics platform 100 may be capable of establishing and provisioning workspaces 102. The analytics platform 100 may also include a registration framework 104 that includes a catalog 120, a deployment layer 106, a platform manager 108, applications and tools 110, storage 112 (e.g., public/private/hybrid cloud storage, local storage), a data curator 114, and an asset governor 116. The components of the analytics platform 100 are shown to be connected using lines to represent explicit or implicit control flow or data flow among components. In addition, for example, some of the components such as the catalog 120 may be accessed via a user interface over a browser interface. The workspaces 102 may interface with the various components using an interface. An access request, for example, may be initiated using a user interface that allows a user to input the parameters of the access request.

The metadata of assets, which may be stored in the catalog 120, may enable control of more than just access to the asset. The data governor 116 can control how, when, and where the asset is transformed, published, moved, copied, ingested, or the like. These functions can be controlled by defining appropriate policies that reference one or more types of attributes of assets. Similar the asset governor can control what type of containers an asset can be stored in, how the asset can be deployed, and the like.

The workspaces 102 correspond to areas in which analytics may be performed. In one example, a workspace may be an isolated, managed, self-service container of virtual machines (VMs) and working data sets, configured and deployed to the workspaces 102 within an analytics platform 100. The workspaces 102 establish the data sets and tools that are accessible by a user (e.g., a Data Scientist or other user) when interacting with the analytics platform and in particular when interacting with assets such as data sets. In one example, the workspaces 102 provide a quota-managed, policy-governed, private sandbox that enables data exploration, transformation, enhancement, and analysis. The workspaces 102 facilitate the use of tools, applications including business applications and services and help with the new development of analytic tools and analytic models In one example, a workspace may include a computing device that is configured to access the data sets of the analytics platform 100 and perform analytics. This may be done using a browser window or using specific applications. When a workspace is instantiated, the workspace may be provisioned with applications and/or tools in addition to one or more data sets. In other words, tools, applications and data sets may be configured and deployed to a workspace. These applications and tools are used by a user to perform analytics on at least one data set or on a portion of a data set.

The asset governor 116 governs access requests to the assets of the analytics platform 100. The asset governor 116 may include policy administration points, policy enforcement points, policy information points, and policy decision points (e.g., implemented as virtual machines in one example in the analytics platform 100 or as services in the analytics platform 100). Whenever access is requested (e.g., to access or use a data set or portion thereof, instantiate a workspace, provision a workspace with a data set or tool, perform an operation on a data set, publish results, ingest a data set into the analytics platform), the request is intercepted or detected by a policy enforcement point, and a policy information point (or other device or module) may collect or identify characteristics or attributes associated with the context of the request, potentially in addition to characteristics or attributes already collected or identified by the policy enforcement point. The collected attributes are passed to a policy decision point that then makes a decision regarding the access based on applicable policies associated with the asset class and the request type. In one embodiment, a policy enforcement point may also serve as a policy information point to collect or identify characteristics or attributes referenced in policies and thus required by the policy decision point.

During operation of the analytics platform 100, the workspaces 102 may interact with other components of the analytics platform 100. For example, a workspace may have access to a catalog 120 included in the registration framework 104. The catalog 120 may include a listing of assets available in the analytics platform. The catalog 120 can be browsed, searched, or the like. This allows a user working on a workspace to identify and select an asset. In one example, the selection of an asset may generate an access request for the selected asset. The asset governor 116 determines whether the access request is granted.

More specifically, the registration framework 104 may associated assets with asset identifiers and asset metadata. The asset identifiers may include the name, a logical or physical identifier and the location of the asset. The asset metadata may include information about the asset as described herein. The asset metadata, which may be included in a manifest maintained by the catalog 104 can be used to govern access to and use of assets.

When searching for an asset, the search parameters can be compared with the asset identifiers and/or the asset metadata. The catalog 120 may be organized in a manner that facilitates a search. For example, the asset metadata may be further divided into additional fields that correspond to specific metadata. One field may contain information that is intrinsic to the asset. Another field may contain information related to deployment of the asset; another field may include user annotations or tags, another field may be related to prior ingestion of the asset. Other fields may include metadata reflecting annotations, quality ratings, inferred quality ratings based on user actions, asset state, deployment instructions, asset transformations, approved containers, approved controllers, and the like or combination thereof. In one example, the catalog 120 includes information necessary to locate the assets and provision or deploy the assets even though a different component of the analytics platform or of the registration framework 104 may actually provision a workspace or deploy the assets. Such catalog information can also be used to enforce multiple polices related to asset use and access.

Assets such as tools, programs, applications, data sets, data sources, data source connections, and the like can be registered by the registration framework 104. Certain of these assets may be associated with services. The registration framework 104 stores information about these assets so that the assets can be shared among users. For example, a tool, as previously stated, is an example of an asset. As a result, tools and information about the tools may be stored in the catalog 120. The registration framework, in addition to registering assets, allows a user to search for tools and other assets based on criteria or parameters. The registration framework 104 enables a user to find and use tools or other assets that may be helpful within the user's workspace or for a user's purpose.

The registration framework 104 may also be able to suggest tools or other assets to a user even when those tools or other assets are not identified or discovered by the search parameters. The asset governor 106 can then control access to or use of requested tools. In fact, the registration framework 104 may suggest assets to a user without any prompt or input from the user. For example, a user may be working with assets that may include a data set and various tools in a workspace. The registration framework 104 may determine that one of the assets is similar to another asset in the analytics platform. In this case, the registration framework 104 may recommend the similar asset to the user, provided the asset governor allows access to the similar asset for the user. In another example, the registration framework 104 can determine or identify tools that were previously used on the asset or that were used on similar assets. The registration framework 104 many then recommend that particular tool to the user. The registration framework 104 may also recommend assets based on user profiles, methods of deployment, preferred controllers, or the like. Similar tools may be recommended to users with similar profiles. In one example, similar assets can be identified based on the asset's class. Similar assets can also be identified using the asset metadata.

Assets can also be tagged. This can be an automatic or a manual process. For example, the source of an asset such as a data set, security classification, sample size, or the like may be associated with the asset or partial asset being used. When an asset is tagged (or annotated), the information in the tag (e.g., a quality assessment) may be added to the catalog 120. In one example, user provided annotations or tags may go through a verification process by a user with sufficient authority.

Controllers and services 118 may be configured to deploy the tools or other assets as previously stated. The tools (or other assets) are deployed along with assets such as data sets into the workspaces in one example. In one example, the registration framework may facilitate a multi-controller approach. Different assets may be deployed, for example, using different controllers. Registering an asset with the analytics platform does not lock the asset into a specific deployment or a specific controller. Registration of an asset or an asset class may be a precursor to deployment and provisioning. Registration does not, however, lock an asset into a specific deployment or specific provisioning. The registration information of an asset may identify multiple controllers and the registration framework may consider this information when selecting a controller to deploy the asset. The deployment of an asset may be based on attributes of an end user (including attributes describing end user role and context), attributes of a workspace, other assets to be included in the deployment, and the like or combination thereof. The registration framework 104 allows assets to be deployed with tools or tool sets.

In one example, the registration framework 104 also allows new classes of assets to be added. A user or customer may define an asset class. When an asset class is added, the class may be defined and the definition may be stored by the registration framework. In one example, the asset class can be registered without actually registering any assets (sometimes known as asset instances) at the time the class is created. In another example, the asset class may be defined when an asset is ingested into the analytics system. The definition of a class may include or identify the type of information (e.g., metadata) to be collected as well as deployment information or deployment instructions. The definition may also identify what tools, applications, and services should be deployed with the asset, and which controllers or services are best suited for use with the asset. A user defining the class may be queried about the parameters that affect deployment and this information may be maintained by the registration framework 104. This information may also address the state of the asset. For example, deploying an asset that is hydrated (e.g., already deployed to a specific database) may be different from deploying an asset that is dehydrated (e.g., independent of deployment to a container or in transit between containers). The state of an asset may be associated with the steps necessary to deploy as asset from a source to a destination.

An asset such as a data set may be stored in an operational data container. The operational data container (ODC) may contain the information or data set that is deployed to a workspace. In one example, an operational data container may be a source of a data set used when performing analytics. An operational data container may be a structure in which other objects or assets are contained. Thus, a data set may be deployed (copied) to an operational data container and a workspace may use the data in the operational data container. For example, the data in the operational data container may be copied to the workspace. In one embodiment, operational data containers may be supplemented or replaced by published data containers.

The registration framework 104 may be configured to use the deployment information associated with the asset to deploy the asset. This may include selecting a controller, selecting an operational data container, and selecting or recommending tools, applications, or the like. The selected assets may be deployed by the deployment layer 106.

In one embodiment, the analytics platform 100 may also include published data containers. In one example, a published data container may be made known to users such that assets stored therein can be accessed.

The asset governor 116 can use the metadata stored in the manifests of the assets or of the asset classes and which may be stored in the catalog 120 to govern access to assets, use of assets, deployment of assets, storage of assets, availability of assets, operations to be performed on or with assets, or the like or combination thereof. The breadth of metadata of different types associated with assets and asset classes enables complex and sophisticated policies to be defined to the asset governor (e.g., through a policy administration point) and applied by the asset governor (e.g., through policy enforcement points, policy information points, and policy decision points) to govern asset access and use.

The analytics platform 100 may also include applications and tools 110. The applications and tools 110 are examples of assets that can be deployed to a workspace. In one example, the catalog 120 may also identify the tools and applications (and other assets) that can be used in the analytics platform 100.

The analytics platform 100 also includes a platform manager 108 and a deployment layer 106. The platform manager 108 may include services such as, by way of example, operational data containers and deployment platforms such as PaaS (Platform as a Service). Using operational data containers, published data containers, and/or other platforms, the applications and tools 110 can be deployed to the workspaces 102 using the deployment layer 106. In one example, a data set may be deployed to an operational container. The working data set may then be copied from the operational container to the workspace.

The analytics platform 100 is configured to receive or ingest assets (e.g., data sets) from asset sources of different types. The data sets or other assets ingested into the analytics platform 100 may have different formats. Assets are often received by the analytics platform 100 in raw form.

The data sets or other assets received by the analytics platform 100 are stored in a storage 112. In some examples, however, the data set or other asset may be stored outside of the analytics platform 100 and may be accessed by reference. The storage 112 may include multiple storage devices and may provide a very large amount of storage.

The physical infrastructure includes storage 112. The physical storage layer may include data arrays, flash storage, disk storage, or the like or combination thereof. The infrastructure may also include a virtualization layer and may provide virtualization services. The physical storage may be virtualized using different virtualization technologies. The virtualization layer allows resources to be dynamically provisioned and managed in one example.

In one example, the infrastructure may be configured as a cluster (e.g., a Hadoop cluster) or as a distributed computing environment. The cluster may include multiple nodes and, in one embodiment, the nodes are virtual machines The analytics platform 100 may include controllers and services 118 that are configured to deploy services, applications, or assets to a workspace 102. The services, applications, or assets may be deployed in response to a granted access request for example. The controllers and services 118 may also deploy certain applications automatically such as security applications, indexing applications, searching applications, ingestion applications, and the like. In addition, the controllers and applications 118 may also deploy data stores, data sets, workspace data and tools.

In one embodiment of the analytics platform 100, the workspaces 102 are environments in which a user may work with assets such as data sets. The analytics platform 100 may support multiple workspaces. For example, one or more data sets may be loaded into each of the workspaces 102. The workspaces 102 may be provisioned with different assets. Tools and applications may also be loaded into each of the workspaces 102. A user may then perform analytics on the data sets in the user's workspace using the tools and applications loaded into the workspace. In one example, a workspace may cooperate with a cluster of virtual machines to access and interact with the data.

The assets may be accessed in isolation. For example, a workspace may be available to a specific user or to a specific group of users. The assets deployed to that workspace or set of workspaces is isolated in the sense that the users may be authenticated or authorized in order to access the assets deployed to the workspace or set of workspaces. Assets can also be isolated in the context of multi-tenancy. When an asset is being used by a user, the data set is isolated from the actions performed on a related asset (e.g., a copy of the asset) by other users in other workspaces.

In another example, the assets may be isolated in the sense that a copy of the data may be deployed to the workspace, for example by loading the data in a database application. Data sets can be virtually provisioned in a workspace.

Figure 2:
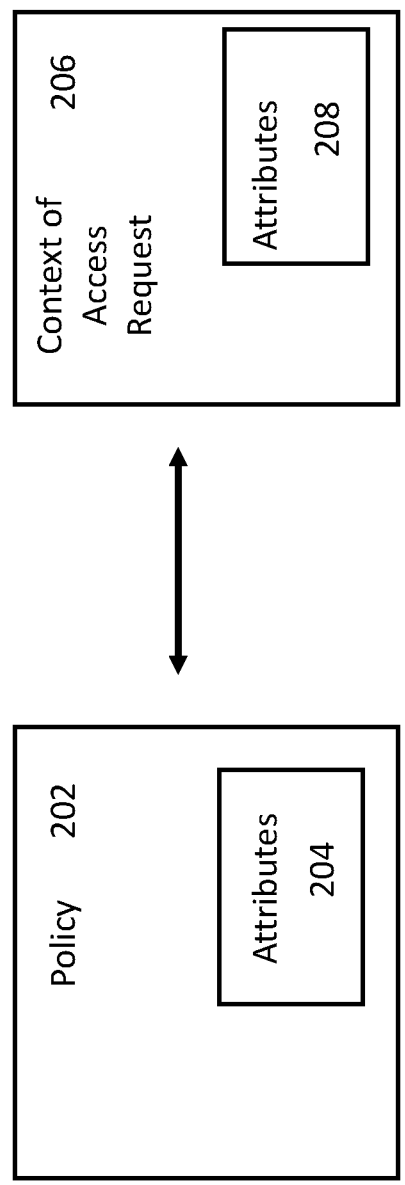
FIG. 2 illustrates an example of a policy that is used by the asset governor to control access to and use of assets and illustrates the relationship of the context of an asset access request to attributes referenced by the policy.

FIG. 2 illustrates an example of a policy used to govern or control access to assets. FIG. 2 illustrates a policy 202. The policy 202 may be maintained by or is accessible to the asset governor. The asset governor may be associated with multiple policies. In one example, the policy 202 may be applied to or associated with one or more assets or one or more asset classes. Policies can also be automatically associated with new asset classes when the new asset classes are added, based on the relationships of the new asset classes to existing asset classes. An analytics platform may be associated with multiple asset classes and each asset class may be associated with one or more policies. Multiple asset classes can be associated with the same or different policies and each policy can be associated with one or more asset classes. If desired, a specific asset (an instance of an asset class) could be associated with a policy as well.

The policy 202 may reference or be associated with attributes 204. The attributes 204 referenced by the policy 202 may be a subset of all attributes that may be maintained by the analytics platform. The attributes 204 associated with the policy 202 are typically defined or selected by an appropriate user (e.g., a user authorized to create or modify policies). In one example, the attributes 204 may also be associated with specific values that may be selected by an appropriate user. For example, if the attributes include a time attribute, the time attribute may indicate that the access request musts occur in an identified time period (e.g., between 8:00 AM and 5:00 PM in a given time zone). When an access request is identified, the context of the access request 206 may be associated with attributes 208. The attributes 208 are collected by the policy information point, the policy enforcement point, or other device or module. Thus, the values of the attributes 208 can be compared with the attributes 204 when applying the policy 202. In other words, the attributes 204 specifically referenced by the policy 202 are the attributes used to determine whether an access request is granted for assets in the asset class 206.

Figure 3:
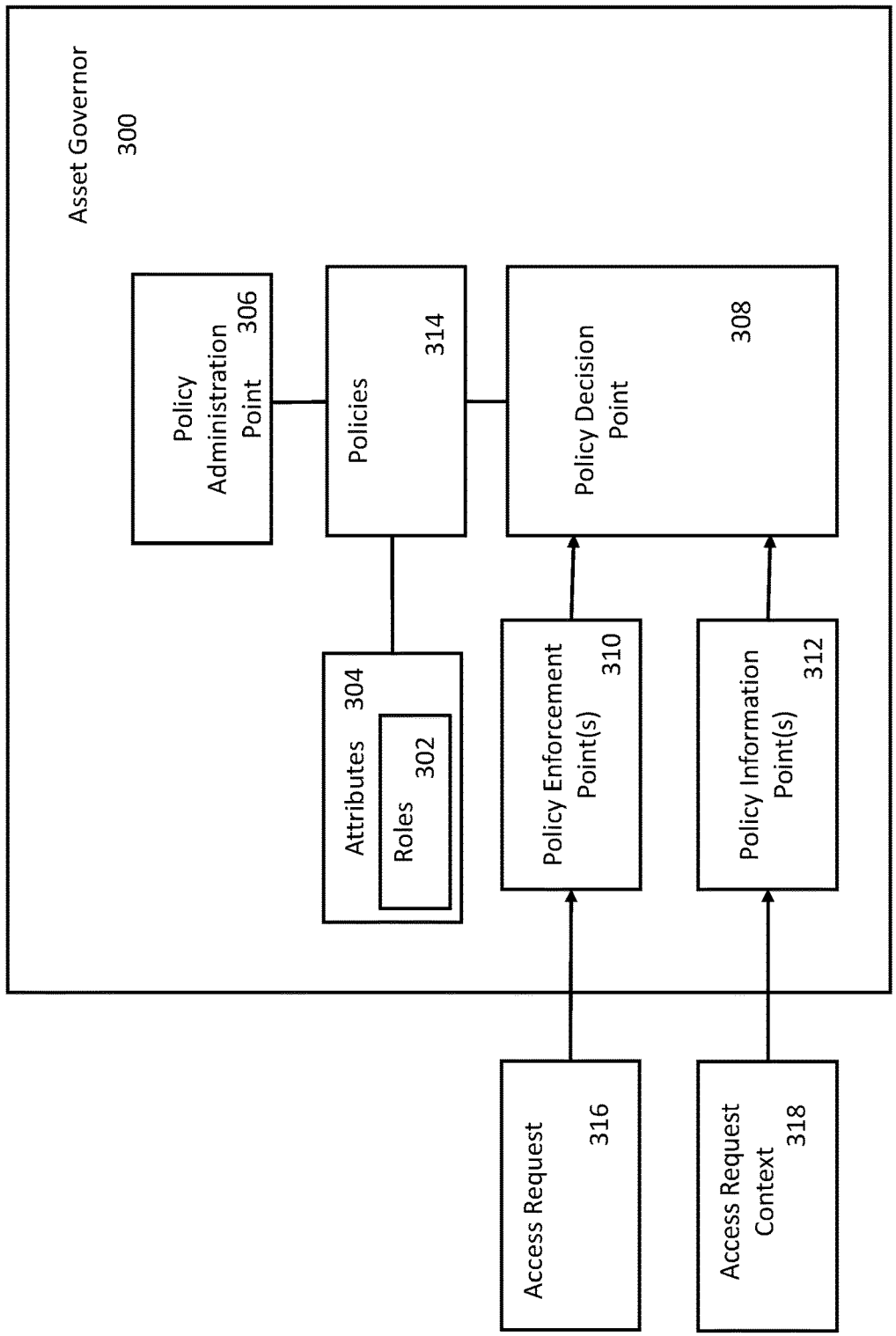
FIG. 3 illustrates an example of an asset governor.

FIG. 3 further illustrates an example of an asset governor 300, which is an example of the asset governor 116. The components of the asset governor 300 may be implemented as modules or services and may be configured to be executable during operation. The governor 300 is configured to manage or perform tasks associated with governing access to and use of assets in an analytics platform. Using attributes 304, the asset governor 304 can perform attribute based access control with respect to the assets of an analytics platform.

In some embodiments, the roles 302 are an example of attributes 304. The roles 302 may include a role of the requestor (the requestor may be a user or a non-human requestor such as an application). The roles 302 may relate to the role of the user (e.g., authorization levels). More generally, the attributes 304 used in attribute based access control can include user attributes, asset attributes, requested operation attributes, environment attributes, roles or the like or combination thereof. The ability of a user to access an asset may be determined by evaluating the roles and other attributes associated with the context of the request. For example, the attributes referenced by a policy may indicate that only users with certain roles (e.g., administrator, data scientist, data engineer) can access a certain asset class or asset. In another example, the attributes 304 can be used to enable granulated access to the assets. Different types of access may be assigned or associated with different attributes, for example. The inclusion of other attributes 304 beyond roles, allows the asset governor 300 to govern access more broadly and dynamically.

In one example, the asset governor 300 can control access with the policy decision point 308 from multiple perspectives. The policies 314, for example, may relate to more than attributes of the asset itself. The policies 314 can be used to control access to or use of the asset from a deployment perspective, a transformation perspective, a state transition perspective, a controller deployment perspective, or the like or combination thereof. For example, an access request to deploy an asset to an operational data container may be granted as long as the operational data container supports a particular type of data set or other asset. An access request to perform a transformation on an asset may be granted as long as the asset is dehydrated. The asset governor 300 can control access requests, for example, using the different types of attributes stored in the manifests or in the catalog 120.

The asset governor 300 can use the attributes maintained in the analytics platform to control how the assets are deployed. The asset governor 300 can be used to ensure that the type of container used for an asset is of a particular type, and/or control how the asset is populated into the container. The asset governor 300 can also control these aspects of operational or published data containers for asset classes including new asset classes added to the analytics platform.

The policy administration point 306 may be implemented as a module or service that allows policies 314 to be defined, modified, activated, de-activated, deleted, or the like or combination thereof. When a policy for an asset class is defined, for example, the policy administration point 306 may be used to select the attributes 304 to be associated or referenced by the policies 314. Each individual policy may be associated with a different set of attributes. The attributes may be selected from the attributes 304. The attributes and associated values selected and identified for each of the policies 314 can be linked or otherwise associated to those policies. During operation of the analytics platform, this allows each of the policies 314 to be individually associated with their own set or subset of attributes and allows assets to be controlled or governed in different manners. The policy administration point 306 can customize the set of attributes 304 (which may include roles 302) for policies related to each asset class or each asset.

The asset governor 300 may also enforce the policies 314. Generally, the policies 314 are enforced when access requests are identified or received. In one example, access requests can be identified by intercepting the access request. In one example, the policy enforcement point 310 is the place in the analytics platform that intercepts access requests. An analytics platform may include multiple policy enforcement points 310. Policy enforcement points 310 are thus located or placed at various locations in the analytics platform. In one example, the policy enforcement points 310 (or the policy information points 312) are located in the deployment layer 106 (see FIG. 1) and/or in the catalog 120, in the controllers and services 118, or the like. By placing the policy enforcement points 310 in one of these locations, each access request issued by a user or from a workspace can be intercepted and either granted, denied, or restricted. The policy enforcement point 310 is configured to intercept access requests 316 and send the access requests to the policy decision point 308.

In some embodiments, policy enforcement points 310 may also be placed or deployed above or in conjunction with data sources or data sets such that access requests for the data sources or the data sets effectively pass through the policy enforcement points 310. Policy enforcement points 310 may be similarly placed with respect to other assets such that requests to use or access assets can be evaluated by the policy decision point 208.

When an access request is intercepted by the policy enforcement point 310, the policy information point 312 may collect or identify the context of the access request. This may include collecting or identifying characteristics or attributes of the access request. The characteristics or attributes collected by the policy information point 312 can include one or more of attributes of the requestor (e.g., user, asset, role, seniority, location, credentials), attributes of the asset requested, attributes of the environment (e.g., time, location of asset, location of requestor, deployed assets, workspace configuration). The attributes may also include attributes that identify relationships of the asset to other assets. For example, an access request for a data set than cannot be used without a certain tool may be denied unless that tool is present. Alternatively, the collected attributes may be used to suggest recommended tools. In one example, the collected attributes may result in a notification to the user regarding a potentially useful tool or application or other asset.

In one example, the request and information or context of the request are provided to the policy decision point 308. The policy decision point 308 receives a notification from the policy enforcement point 310 that an access request has been detected or intercepted. The policy decision point 308 also receives information about attributes collected or identified by the policy information point 312. Then policy decision point 308 then evaluates the context 318 of the access request 316 in light of the policies 314, in particular the policy or policies associated with the asset or asset class associated with the access request 316. Access is then granted or denied by the policy decision point 308.

In one example, the information provided to the policy decision point 308 includes the class of the requested asset. The policy decision point 308 can then access the set of active policies, based on the asset class, to identify the policy or policies to apply to the collected information. The collected attributes or context 318 of the access request 316 are then evaluated in light of the attributes referenced by the policies 314. Access is then granted, partially granted, or denied based on the results of the evaluation performed by the policy decision point 308.

Figure 4:
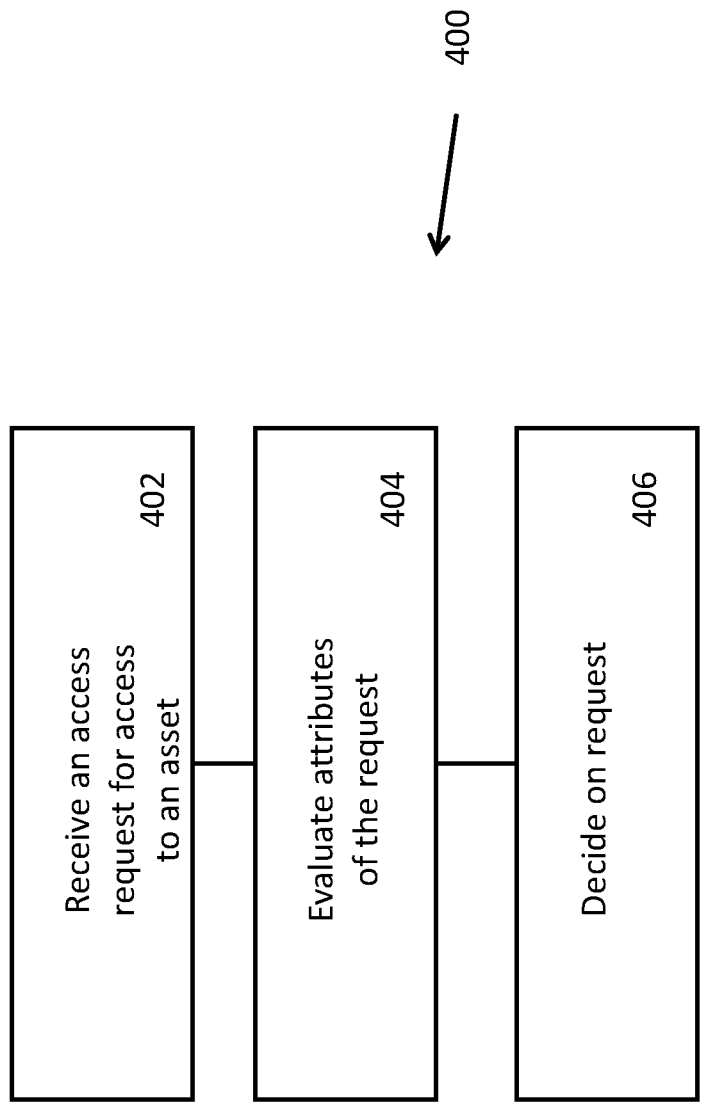
FIG. 4 is an example of a method for controlling access to or use of an asset in an analytics platform.

FIG. 3 illustrates policy enforcement points 310, policy information points 312, and policy decision points 308, each of which may be implemented as services in the analytics platform. However, evaluating an access request can be performed using other configurations. In one example, the policy information points 312 may be omitted. Instead, the policy enforcement points 310 can extract or identify all of the attribute values from the access requests for policy evaluation. The policy enforcement points 310 can pass these values to the policy decision point 308. In another example, the policy information point 312 may pass the attributes of the access request context to the policy enforcement point 310 and the policy enforcement point 310 passes these values to the policy decision point 310. In addition, the asset governor may be associated with or control multiple policy enforcement points 310, multiple policy information points 312, and/or multiple policy decision points 308. FIG. 4 is an example of a method for governing access to and use of assets in an analytics platform. In block 402, an access request to an asset of the analytics platform is received. This may include intercepting the asset request for the asset in the analytics platform at some location. In one example, a policy enforcement point is located above the requested asset (or at another location in the analytics platform) and is configured to intercept access requests for the asset. The access request is then sent to and received by a policy decision point.

In box 404, attributes associated with the access request that was identified or intercepted by a policy enforcement point are evaluated by comparing the attributes of the access request with attributes associated with a policy instituted for the asset or for a class of the asset. In one example, attributes of the access request, which constitute the context of the access request, are collected by a policy information point or other service when the access request is intercepted or when the access request is received. In one example, a policy information point may collect or identify attributes of the access request. In one example, a set of default attributes will be collected. Additional attributes can be collected later if necessary. The policy decision point, for example, may request additional information from the policy information point. In another example, the attributes collected or generated by the policy information point may be driven by the one or more policies of the asset or of the asset class. In one example, the asset class may be associated with a list of attributes to be collected. The policy information point may identify which attributes to collect from the policy and the collected attributes are then provided to or received by the policy decision point.

The attributes referenced by a policy can vary widely and may include, but are not limited to, role of user, lineage of asset, quality of asset, data quality, deployed tools, permissible locations, user seniorities, quotas for user, organizations or groupings, or other attributes discussed herein. The quotas may include quotas on operations, resource utilization, or simultaneous requests that apply to users, organizations or other groupings of users.

In box 406, the access request is decided. The access request may be granted or denied based on whether the collected attribute values satisfy the policy.

Figure 5:
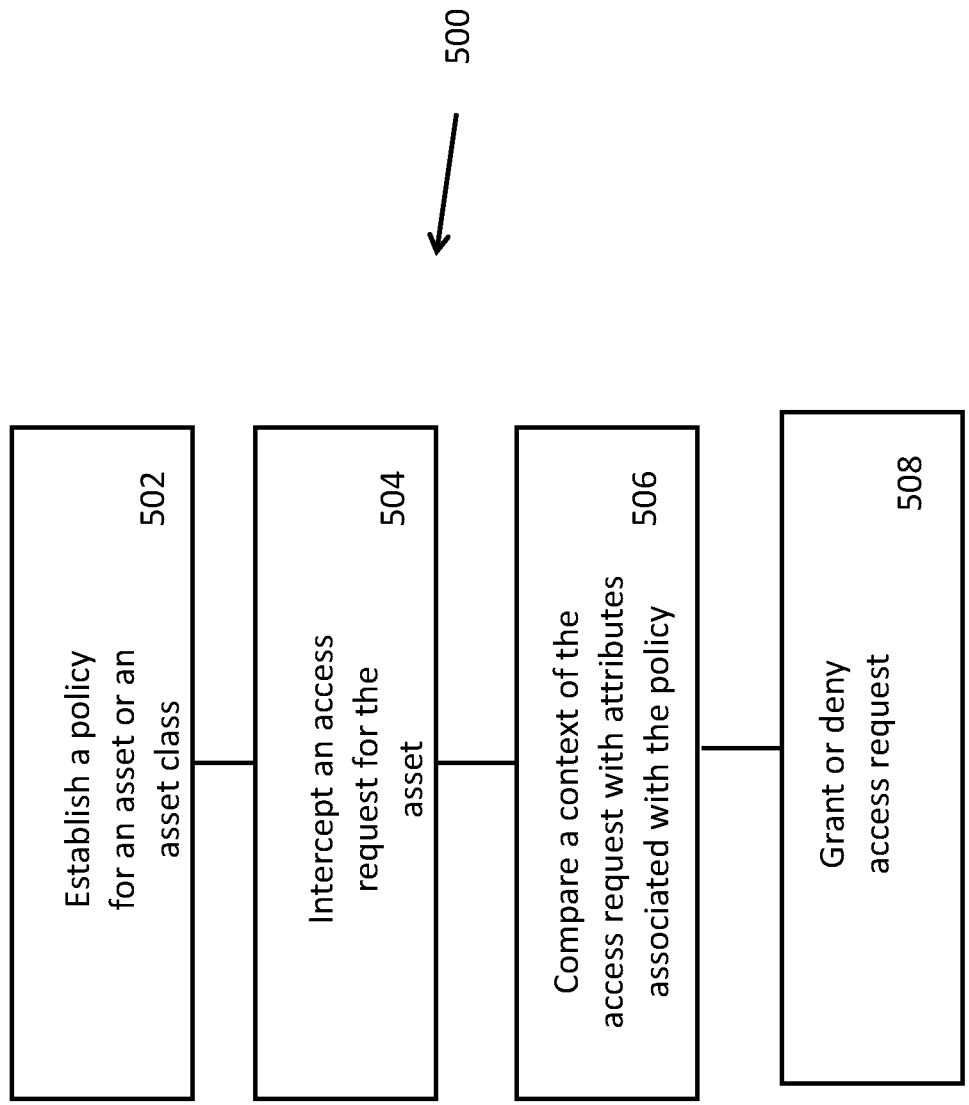
FIG. 5 illustrates another example of a method for controlling access to or use of an asset in an analytics platform.

FIG. 5 illustrates an example of a method 500 for enforcing policies that govern access to or use of assets in an analytics platform. In box 502, a policy is established or defined for one or more assets or for one or more asset classes that are stored in or accessible to the analytics platform. Establishing the policy may include identifying attributes and/or associated attribute values that determine the context in which the asset may be accessed or used. The identified attributes, for example, identify an acceptable context for access to or use of an asset. When the context of the access request matches the context defined by the attributes associated with the policy of the asset or asset class, the access request is granted. As a result, the attributes can identify or determine when access should be denied, granted, or partially granted. In one example, the attributes associated with the policy can be set by a user with sufficient rights, by default, or the like. The attributes associated with a policy can also be adjusted over time. Further, the attributes may set forth values or ranges of values. When the attributes of the context are collected, access to or use of the asset may be granted as long as the collected attributes match or are within the values set forth in the attributes associated with the policy.

In box 504, after the policy has been established and the asset is made available in or to the analytics platform, an access request for the asset may be intercepted. An access request can be intercepted at multiple locations in an analytics platform. In one example, the analytic platforms may include software layers (e.g., policy enforcement points) over the assets. Thus, when an access request is made, the access request can be intercepted. When the access request is intercepted, attributes surrounding the request may be collected.

In box 506, the context of the access request (e.g., the collected attributes) are compared with the attributes associated with the policy. In box 508, access is granted or denied (or partially granted) based on whether the collected attributes sufficiently satisfy the policy. As previously stated, attributes may relate to, but are not limited to, the role of the requestor, the subject matter of the asset, an operation or requested use associated with the request, and the environment of the request, or the like.

The analytics platform can extend the operations of the asset governor to new assets. For example, a new asset added to the analytics platform may be automatically associated with a policy based on similarities between the new asset and existing assets. In another example, policies are automatically associated with the new asset based on the class of the new asset. The class of the asset can be provided by the submitter of the asset or by an evaluation of the attributes of the asset and their similarity to existing assets. Once the asset class is identified, the applicable policies can be automatically defined or applied. An asset containing personal information, for example, may be dynamically associated with a policy that protects personal data. Such a policy may restrict access to the asset based on the personal data. In other words, an asset that contains personal data may be associated with a personal data class. This may be achieved by tagging the asset in the asset's metadata. Policies defined for the personal data class are then associated with the new asset. In one example, polices can be customized for specific assets within a class.

In another example, a new asset class may be created. Policies can be assigned to the new asset class based on similarities between the new asset class and existing asset classes or based on similarities between new assets and existing assets.

Policies assigned to the assets or asset classes can be refined or changed based on user feedback. Policies associated with assets that are difficult to access may be changed so that the assets are easier to access (e.g., policy-based requirements for access may be made less restrictive), policies associated with assets that receive high marks from users or that are deemed to be of high quality may be changed as well. Attributes (or values of the attributes) associated with a policy can be added to, removed from, or changed based on user satisfaction levels and for other reasons.

In one example, attributes can be associated with actions that were performed on the data. For example, attributes may refer to aspects or states of tokenization, encryption, or the like. Assets that are tokenized or encrypted may associated with or placed in, respectively, a tokenized class or an encrypted class and associated with the appropriate policies. It may be possible for an asset to be associated with multiple classes and the policies applicable to each class may need to be satisfied before the access request is granted. This may occur at the asset instance level, or at a lower level of granularity within the asset (e.g., a field within a record may have been encrypted or tokenized).

Policies managed or maintained by as asset governor can be dynamically modified. The asset governor can also be proactive in identifying changes to existing policies or in recommending policies for assets or in recommending changes to policies of the analytics platform. In one example, automated proposals relating to new or improved polices for asset governance may be generated, distributed or recommended.

Assets and their corresponding policies can be navigated in different ways. In one example, assets can be navigated or discovered using, for example, the catalog shown in FIG. 1. The catalog may identify the assets available in the analytics platform and is an example of an asset space. The policy space can also be navigated. The policy space, for example, may be navigated to identify restrictions on operations (or other access requests) that may be performed on assets.

The asset space and the policy space can be navigated in a combined manner. For example, the policy space can be navigated to identify policies related to a particular asset or a particular asset class. During combined navigation, the asset space can then be navigated to identify similar assets and to identify the policies associated with the similar assets. The policy space can then be used to identify or recommend policies that should be applied to the similar assets identified when navigating the asset space. A combined navigation of the policy space and the asset space can result in automated proposals to users regarding policies for governing access to an asset that are based on policies for similar assets.

Policies may be modified based on user satisfaction. For example, data sets may be associated with quality ratings (e.g., poor, fair, good, excellent or the like). These ratings can be changed based on a user's interaction with the assets. For example, these policies can be modified after users have accessed to the assets or after access to the access is denied. For example, the policy may indicate that senior managers may have access to a data set when the data set is rated as fair in quality. Over time, senior managers may complain about the quality of the data set or about results associated with use of the data set. In this example, the policy may be changed such that access to senior managers is granted only when the quality is rated as good. Thus, responses by users that perform analytics with the assets as well as responses by users that view results of the analytics can be used to adjust the associated policies. Thus, a policy can be tuned or optimized over time.

In another example, attributes of the assets can be adjusted by the policies. The policies may be able to modify quality ratings (or other attributes) of an asset based on user satisfactions and interactions with the assets.

Assets can be registered with an analytics platform, ingested, published, or the like. These assets may have attributes that are not intrinsic to the asset or to the context of the request. These attributes are generated and may be related to operations that happen to the asset. For example, attributes representing asset states (e.g., unregistered or registered, external or ingested, unpublished or published, hydrated or dehydrated) are examples of attributes that may also be considered when governing access to the assets. Ratings or recommendations and annotations are other examples of attributes that may not be intrinsic to an asset. These attributes can be added over time and can be referenced by and thus associated with policies over time.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer. Embodiments of the invention further include distributed computing environments, converged computing environments, or the like.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer implemented method, executed by a hardware processor, for controlling access to and use of assets in an analytics platform, the method comprising:
browsing, by the hardware processor, assets in the analytics platform, wherein the assets are configured to be browsed in multiple dimensions, the multiple dimensions including user attributes, asset attributes, use of the assets in the analytics platform by users, and how assets are deployed;
receiving, by the hardware processor, an access request for an asset of the analytics platform, wherein the asset is associated with one or more policies that govern access to and use of the asset;
collecting attributes of a context of the access request, wherein the attributes of the context of the access request include attributes of an operation to be performed on or using the asset, attributes of a context in which the access request is made, attributes of a user, attributes of the access request, and attributes of an environment, wherein the attributes define the context of the access request;
evaluating, by the hardware processor, the access request by comparing the context of the access request with attributes included in the one or more policies associated with the requested asset;
granting, by the hardware processor, the access request when the context of the access request satisfies the attributes included in the one or more policies, wherein the one or more policies control access to and use of the requested asset, wherein the controlled use includes controlling use of the requested asset in the multiple dimensions; and
deploying the asset to a workspace and deploying at least one tool to the workspace.

2. The computer implemented method of claim 1, wherein the one or more policies relate to one or more of accessing the asset, transforming the asset, publishing the asset, moving the asset, copying the asset, or determining a container for the asset during deployment.

3. The computer implemented method of claim 1, wherein evaluating the access request further comprises applying the one or more policies to the attributes associated with the context of the asset request, wherein each of the one or more policies is associated with one or more assets or one or more asset classes.

4. The computer implemented method of claim 1, further comprising identifying attributes associated with a class of the asset.

5. The computer implemented method of claim 1, wherein attributes of the context of the access request include one or more of permissible locations for making the access request, role of a requestor, operation requested, or asset, or histories of the asset, prior assessments of a quality of the asset or of a lineage of the asset, further comprising granting access to the asset when a location, role, or history associated with the context match the locations, seniorities, prior assessment, or histories referenced by the one or more policies.

6. The computer implemented method of claim 1, wherein further comprising tuning a choice of attributes referenced by the one or more policies, or tuning conditions on values of the attributes referenced by the one or more policies.

7. The computer implemented method of claim 1, further comprising enforcing the one or more policies in a distributed manner that includes multiple enforcement points.

8. The computer implemented method of claim 7, wherein enforcing the one or more policies in a distributed manner includes:
  intercepting the access request at a policy enforcement point that is positioned in the analytics platform;
  collecting the attributes with a policy information point or with the policy enforcement point;
  sending the collected attributes and the access request to a policy decision point; and
  deciding on the access request by the policy decision point by comparing the collected attributes with the attributes referenced by each of the one or more policies, wherein the access request is granted when each of the one or more policies is satisfied by the collected attributes.

9. A computer implemented method, executed by a hardware processor, for enforcing policies that control access to or use of assets in an analytics platform, the method comprising:
  establishing, by the hardware processor, multiple policies for the assets stored in or accessible by an analytics platform, wherein the policies reference attributes that determine when access is granted to the assets and when and how operations can be performed on or with the assets;
  browsing, by the hardware processor, the assets, wherein the assets are configured to be browsed in multiple dimensions, the multiple dimensions including user attributes, asset attributes, use of the assets in the analytics platform by users, wherein policies associated with the assets control which of the multiple dimensions can be navigated for the assets;
  intercepting, by the hardware processor, an access request for an asset identified from browsing the assets, wherein the analytics platform is configured to intercept the access request at multiple locations in the analytics platform;
  collecting attributes after intercepting the access request, wherein the attributes define a context of the access request and include attributes of an operation to be performed on or using the asset, attributes of a context in which the access request is made attributes of a user, attributes of the access request and attributes of an environment wherein the attributes define the context of the access request;
  comparing, by the hardware processor, the context of the access request with the attributes in the policies associated with the requested asset; and
  granting, by the hardware processor, the access request to the asset when the context complies with the attributes included in the policies associated with the requested asset, wherein the policies associated with the requested asset control access to and use of the requested asset, wherein the controlled use includes controlling use of the requested asset in the multiple dimensions.

10. The computer implemented method of claim 9, wherein the attributes referenced by the polices relate to one or more of attributes of an operation to be performed on or with the asset, and of the context of the access request.

11. The computer implemented method of claim 9, further comprising automatically establishing a new policy for a new asset class based on similarities between one or more assets in the new asset class and one or more assets in an existing asset class, or based on similarities between a class of the new asset and a class of the asset.

12. The computer implemented method of claim 9, further comprising refining one or more of the policies based on post-operation user satisfaction levels.

13. The computer implemented method of claim 12, further comprising refining one or more of the policies based on inferred user satisfaction levels based on an evaluation of actions performed by the user.

14. The computer implemented method of claim 9, wherein the context includes determining whether the asset was tokenized, encrypted, or obscured.

15. The computer implemented method of claim 9, wherein collecting attributes further includes:
  identifying attributes associated with one or more of registration of the asset, ingestion of the asset, publication of the asset, deployment of the asset, history of the asset, lineage of the asset, movement of the asset, transformation of the asset, or copying of the asset,
  identifying attributes about the requestor and the asset; and
  identifying attributes including recommendations and annotations associated with the asset;
  identifying attributes about the context of the request.

16. The computer implemented method of claim 9, further comprising identifying attributes including quotas on operations, resource utilization, or simultaneous requests that apply to users, organizations or other groupings of users.

17. The computer implemented method of claim 9, further comprising automatically proposing changes to one or more of the policies based on similarities between the asset and other assets in the analytics platform or based on similarities between a class of the asset and classes of the other assets.

18. The computer implemented method of claim 9, wherein the policies related to requested operations on an asset that include one or more of accessing the asset, transforming the asset, publishing the asset, moving the asset, copying the asset, or determining a container for the asset during deployment.

19. The computer implemented method of claim 9, further comprising evaluating the context of the asset based on a state of the asset.

20. The computer implemented method of claim 9, wherein the policies are used to control which containers are used when deploying the asset and which controllers are used to deploy the asset.

21. The computer implemented method of claim 9, wherein assets are associated with multiple dimensions based on metadata and relationships and can be browsed or searched in the multiple dimensions, wherein the policies control which dimensions can be navigated.

22. The computer implemented method of claim 9, wherein the policies control access to and use of assets and operations performed on assets based on multiple metadata types.

23. The computer implemented method of claim 22, wherein the policies are defined and applied through policy administration points, policy enforcement points, policy information points, and policy decision points.

24. An analytics platform configured to enable analytics operations on assets including data sets, the analytics platform comprising:
- a hardware processor and memory, the hardware processor configured to implement:
- a registration framework configured to maintain a catalog, wherein the catalog stores attributes about assets included in the analytics platform, wherein the attributes relate to at least the assets themselves, deploying the assets, containers for containing the assets, transforming the asset, copying the asset, and publishing the assets, wherein the registration framework avows the assets to be browsed in multiple dimensions, the multiple dimensions including user attributes, asset attributes, use of the assets in the analytics platform by users, which assets are deployed, wherein policies associated with the assets control which of the multiple dimensions can be navigated far the assets;
- an asset governor configured to collect attributes after receiving an access request including attributes of a user, the collected attributes defining a context of the access request, wherein the attributes include attributes of an operation to be performed on or using the asset, attributes of a context in which the access request is made, attributes of a user, attributes of the access request;
- wherein the asset governor is configured to enforce policies that control access to and use of the assets, wherein the controlled use includes controlling use of the requested asset in the multiple dimensions; and
- a policy decision point configured to receive the context of the asset request and evaluate applicable policies associated with the requested asset with respect to the context of the asset request at least by comparing the collected attributes with attributes included in applicable policies.

* * * * *